(12) United States Patent
Chen et al.

(10) Patent No.: US 12,484,211 B2
(45) Date of Patent: Nov. 25, 2025

(54) MEMORY STRUCTURE WITH THREE TRANSISTORS

(71) Applicant: MACRONIX INTERNATIONAL CO., LTD., Hsinchu (TW)

(72) Inventors: Wei-Chen Chen, Taoyuan (TW); Hang-Ting Lue, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 582 days.

(21) Appl. No.: 18/047,662

(22) Filed: Oct. 19, 2022

(65) Prior Publication Data

US 2024/0008249 A1 Jan. 4, 2024

Related U.S. Application Data

(60) Provisional application No. 63/358,214, filed on Jul. 4, 2022.

(51) Int. Cl.
*H10B 12/00* (2023.01)
*G11C 11/34* (2006.01)
(Continued)

(52) U.S. Cl.
CPC .............. *H10B 12/20* (2023.02); *G11C 11/34* (2013.01); *G11C 11/39* (2013.01); *G11C 11/40* (2013.01); *H10B 80/00* (2023.02); *H10B 99/20* (2023.02)

(58) Field of Classification Search
CPC ........ H10B 12/20; H10B 80/00; H10B 99/20; G11C 11/34; G11C 11/39; G11C 11/40
See application file for complete search history.

(56) References Cited

U.S. PATENT DOCUMENTS

| 8,503,213 B2* | 8/2013 | Chen .................. G11C 16/0483 365/185.17 |
| 9,276,000 B2 | 3/2016 | Fazan |

(Continued)

FOREIGN PATENT DOCUMENTS

| CN | 113594166 A | * 11/2021 | ........... H10D 30/701 |
| JP | 2011527515 A | * 10/2011 | ............. H10D 88/01 |

(Continued)

OTHER PUBLICATIONS

EP Search report dated Jul. 13, 2023 in European application No. 22209254.6-1212.

(Continued)

*Primary Examiner* — Matthew E Warren
(74) *Attorney, Agent, or Firm* — McClure, Qualey & Rodack, LLP

(57) ABSTRACT

A memory structure includes a substrate, a first gate structure, a second gate structure, a third gate structure, and channel bodies separated from each other and passing through the first gate structure, the second gate structure and the third gate structure along a first direction. The first gate structure, the second gate structure and the third gate structure are disposed on the substrate, and are separated from each other along the first direction and extend respectively along a second direction and a third direction. The first gate includes first, second and third island structures respectively extending along the third direction and separated from each other along the second direction. The third gate structure includes fourth, fifth and sixth island structures respectively extending along the third direction and separated from each other along the second direction.

19 Claims, 16 Drawing Sheets

(51) Int. Cl.
    *G11C 11/39*     (2006.01)
    *G11C 11/40*     (2006.01)
    *H10B 80/00*     (2023.01)
    *H10B 99/00*     (2023.01)

(56) References Cited

U.S. PATENT DOCUMENTS

| | | |
|---|---|---|
| 10,256,242 B2 | 4/2019 | Huang |
| 2019/0103407 A1 | 4/2019 | Kim |
| 2021/0358913 A1* | 11/2021 | Kim ........................ H10B 12/30 |
| 2022/0028857 A1 | 1/2022 | Baek et al. |
| 2022/0068922 A1* | 3/2022 | Chen ................... G11C 11/5671 |
| 2022/0130856 A1* | 4/2022 | Kim .......................... G11C 7/18 |
| 2022/0139948 A1 | 5/2022 | Lee et al. |
| 2025/0174265 A1* | 5/2025 | Kim .................... G11C 11/4085 |

FOREIGN PATENT DOCUMENTS

| | | |
|---|---|---|
| KR | 20170114838 A | 10/2017 |
| KR | 20190038223 A | 4/2019 |
| TW | 201822304 A | 6/2018 |
| TW | 202220187 A | 5/2022 |

OTHER PUBLICATIONS

KR Office Action dated Oct. 29, 2024 in application No. 10-2022-0183993.
KIPO Office Action dated May 22, 2024 in KR application No. 10-2022-0183993.
JP Office Action dated Aug. 27, 2024 in Japanese application 2023-001700.

* cited by examiner

MEMORY STRUCTURE WITH THREE TRANSISTORS

This application claims the benefit of U.S. provisional application Ser. No. 63/358,214, filed Jul. 4, 2022, the subject matter of which is incorporated herein by reference.

BACKGROUND OF THE INVENTION

Field of the Invention

The invention relates in general to a semiconductor structure, and more particularly to a memory structure.

Description of the Related Art

In conventional dynamic random access memories (DRAMs), the data of each bit needs one transistor (1T) and one capacitor (1C) to process, namely 1T1C DRAM. However, in order to meet the market demand, the size of the memory structure needs to be smaller and smaller. 1T1C DRAM also faces more challenges, such as leakage current, complex process and increased cost.

Therefore, the structure of the conventional DRAM still needs to be further improved to maintain the performance of the memory structure while reducing the size of the memory structure.

SUMMARY OF THE INVENTION

The present invention relates to a memory structure based on a thyristor operating mechanism, which has the advantages of high scalability and fast operation speed.

According to an embodiment of the present invention, a memory structure is provided. The memory structure includes a substrate, a first gate structure, a second gate structure, a third gate structure, and a plurality of channel bodies. The substrate has an upper surface. The first gate structure, the second gate structure and the third gate structure are disposed on the substrate, and are separated from each other along a first direction and extend respectively along a second direction and a third direction. The first direction, the second direction, and the third direction intersect each other. The second gate structure is disposed between the first gate structure and the third gate structure. The first gate includes a first island structure, a second island structure and a third island structure. The third gate structure includes a fourth island structure, a fifth island structure and a sixth island structure. The first island structure, the second island structure and the third island structure respectively extend along the third direction and are separated from each other along the second direction. The fourth island structure, the fifth island structure and the sixth island structure respectively extend along the third direction and are separated from each other along the second direction. The channel bodies are separated from each other and pass through the first gate structure, the second gate structure and the third gate structure along the first direction.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
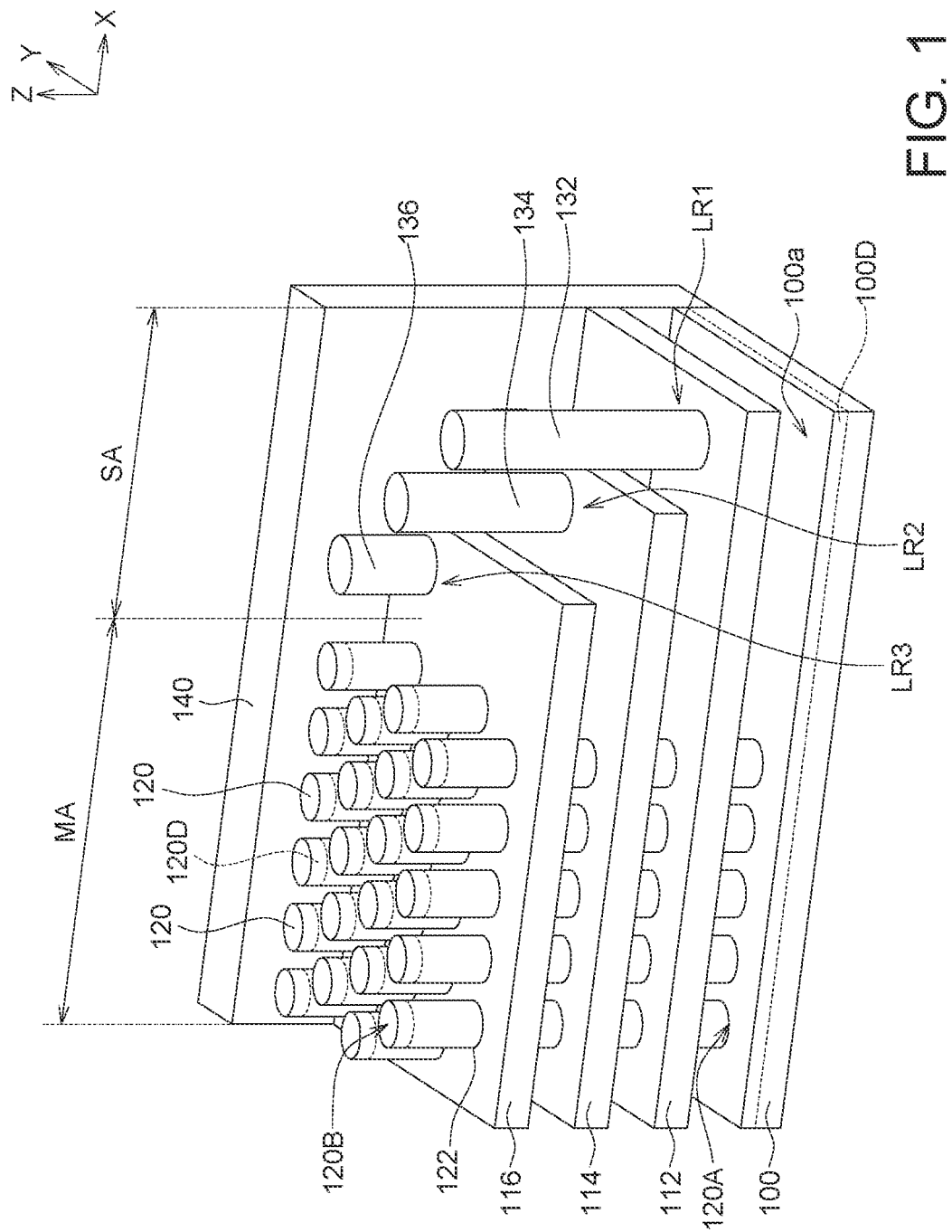
FIG. 1 shows a schematic stereogram of a memory structure according to an embodiment of the present invention.

The following are related embodiments, together with the drawings, to describe the memory structure provided by the present disclosure in detail. However, the present disclosure is not limited thereto. The descriptions in the embodiments, such as the detailed structure, the steps of the manufacturing method, and the material application, etc., are only for the purpose of illustration, and the scope of protection of the present disclosure is not limited to the mentioned implementation aspects.

At the same time, it should be noted that this disclosure does not show all possible embodiments. One of ordinary skilled in the art can make changes and modifications to the structures and manufacturing methods of the embodiments to meet the needs of practical applications without departing from the spirit and scope of the present disclosure. Therefore, other implementation aspects not proposed in the present disclosure may also be applicable. Furthermore, the drawings are simplified for the purpose of clearly explaining the contents of the embodiments, and the dimension and ratios in the drawings are not drawn according to the actual product scale. Therefore, the description and the drawings are only used to describe the embodiments, rather than to limit the protection scope of the present disclosure. The same or similar reference numerals are used to represent the same or similar elements.

In order to meet the demand for size miniaturization, various alternatives to capacitor-less DRAMs have been studied in the industry. For example, single-transistor DRAM (1T DRAM) has been proposed. Conventional 1T DRAM consists of a single MOSFET fabricated on a portion of the SOI substrate, which utilizes the floating body effect to generate excess holes through impact ionization and store them in the neutral body, and this state is defined as logic "1". On the other hand, when the hole is forward biased to be swept out of the neutral body, it is in a logic "0" state. Since then, a thyristor RAM (abbreviated as TRAM) has been proposed, which utilizes the bi-stability of PNPN thyristors without the need of applying a large bias to induce impact ionization as in the typical 1T DRAM.

The memory structure provided in the present invention is an architecture derived from 1T DRAM operation for improved TRAM operation. Compared to a typical 1T DRAM, the semiconductor structure and operating mechanism according to the present invention can have a large sensing margin of current (e.g., 60 µA) between logic "1" and logic "0" states. The pulse width can be shortened (e.g. 50 ns) without reducing the window. The retention time at room temperature can be increased (for example, up to 3 seconds), and the read-disturb-free time can be increased (for example, up to 2 seconds). These properties turn the memory structure and the mechanism for operating the memory structure of the present invention into a promising DRAM candidate with high scalability and fast operation speed.

The present invention provides a three-dimensional memory structure including 3 transistors (3T) (as shown in memory structures 10 and in FIGS. 1 and 19), for 3D DRAM characteristics and thyristor operation.

FIG. 1 is a schematic stereogram of a memory structure 10 according to an embodiment of the present invention. In the present embodiment, Z direction represents a first direction, Y direction represents a second direction, and X direction represents a third direction, as shown in FIG.

Referring to FIG. 1, a memory structure 10 includes a substrate 100, a first gate structure 112, a second gate structure 114, a third gate structure 116, a plurality of channel bodies 120, a plurality of dielectric films 122, a first plug 132, a second plug 134, a third plug 136 and a first side plug 140. The substrate 100 has an upper surface 100a, the upper surface 100a is parallel to the second direction (e.g., Y direction) and the third direction (e.g., X direction), and a normal direction of the upper surface 100a is parallel to the first direction (e.g., Z direction). A dopant may be doped in a region 100D of the substrate 100 adjacent to the upper surface 100a, In one embodiment, the region 100D of the substrate 100 adjacent to the upper surface 100a has a first conductivity type, for example, a high concentration of an N-type doping (N+). The region 100D in the substrate 100 may serve as a common source line.

The first gate structure 112, the second gate structure 114 and the third gate structure 116 are disposed on the substrate 100, are sequentially stacked along the first direction (e.g., Z direction) and are separated from each other, and are respectively extend along the second direction (e.g., Y direction) and the third direction (e.g., X direction), wherein the second gate structure 114 is disposed between the first gate structure 112 and the third gate structure 116. In order to make the drawing more concise, some insulating materials are omitted in FIG. 1, for example, the insulating materials between the substrate 100, the first gate structure 112, the second gate structure 114 and the third gate structure 116 are omitted. In some embodiments, the first gate structure 112, the second gate structure 114 and the third gate structure 116 may serve as a word line, respectively.

The channel bodies 120 are separated from each other along the second direction (e.g., Y direction) and the third direction (e.g., X direction) and pass through the first gate structure 112, the second gate structure 114 and the third gate structure 116 along the first direction (e.g., Z direction), and extend to the substrate 100, for example, the channel bodies 120 are in electrical contact with the substrate 100 to form vertical channel structures, A transistor is formed at each of intersections between the channel bodies 120 and each of gate structures (i.e., the first gate structure 112, the second gate structure 114 and the third gate structure 116). Each of the channel bodies 120 has a first end 120A electrically contacting the upper surface 100a of the substrate 100 and a second end 120B farther away from the upper surface 100a, and the second end 120B is opposite to the first end 120A. A dopant may be doped in the regions 120D of the channel bodies 120 adjacent to the second ends 120B.

In the present embodiment, for example, a thyristor is used as the operating mechanism, the regions 120D of the channel bodies 120 adjacent to the second ends 120B have a second conductivity type, such as a high concentration of P type doping (P+). The region 100D can be served as a source, and the regions 120D can be served as drains, but the invention is not limited thereto.

The dielectric films 122 are disposed between the first gate structure 112 and the channel bodies 120, between the second gate structure 114 and the channel bodies 120, and between the third gate structure 116 and the channel bodies 120. That is, the dielectric films 122 extend along the first direction (e.g., Z direction) and surround side surfaces of the channel bodies 120 to separate the first gate structure 112 from the channel bodies 120, separate the second gate structure 114 from the channel bodies 120, and separate the third gate structure 116 from the channel bodies 120.

The first gate structure 112, the second gate structure 114 and the third gate structure 116 surround each of the dielectric films 122 and each of the channel bodies 120, and it is also called a gate-all-around (GAA) structure. Moreover, each of channel bodies 120 can be controlled by three gates (i.e., the first gate structure 112, the second gate structure 114 and the third gate structure 116).

The first side plug 140 extends along the first direction (e.g., Z direction) and the third direction (e.g. X direction), and is in electrical contact with the substrate 100. For example, the first side plug 140 is electrically connected to the substrate 100 and the channel bodies 120.

The substrate 100 corresponds to a memory array area MA and a staircase area SA. The channel bodies 120 are disposed in the memory array area MA. The staircase area SA is adjacent to the memory array area MA. The first gate structure 112, the second gate structure 114 and the third gate structure 116 form a stepped structure in the staircase area SA, and expose a first landing region LR1, a second landing region LR2 and a third landing region LR3, respectively. A first plug 132, a second plug 134, and a third plug 136 are respectively disposed on the first landing region LR1, the second landing region LR2 and the third landing region LR3, and respectively extend along the first direction (e.g., Z direction) to electrically contact the first gate structure 112, the second gate structure 114 and the third gate structure 116.

In some embodiments, the substrate 100 may include a semiconductor substrate, such as a bulk silicon substrate. In the present embodiment, the channel bodies 120 may be formed by an epitaxial growth process, and the material of the channel bodies 120 may include monocrystalline silicon. During operation (e.g., programming or erasing) of the memory device 10, the channel bodies 120 may be used to store carriers (e.g., electrons or holes). The dielectric films 122 do not need to have the function of storing carriers (e.g., electrons or holes), so the dielectric films 122 do not include a charge storage structure, such as an oxide-nitride-oxide (ONO) structure. In one embodiment, the material of the dielectric films 122 include a dielectric material, such as oxide, and the dielectric films 122 may be a single-layer structure. In one embodiment, the material of the dielectric film 122 may include a high dielectric constant material (high-k material). In one embodiment, the material of the first plug 132, the second plug 134, the third plug 136, the first side plug 140, the first gate structure 112, the second gate structure 114, and the third gate structure 116 may comprise a semiconductor material or a metallic material. In the present embodiment, the first gate structure 112 may include polysilicon, and the second gate structure 114 and third gate structure 116 may include metal, respectively. It should be understood that the materials of the above-mentioned elements of the present invention are not limited thereto.

FIGS. 2 to 18 illustrate the results of operating the memory structure as shown in FIG. 1 through the thyristor mechanism.

Figure 2:
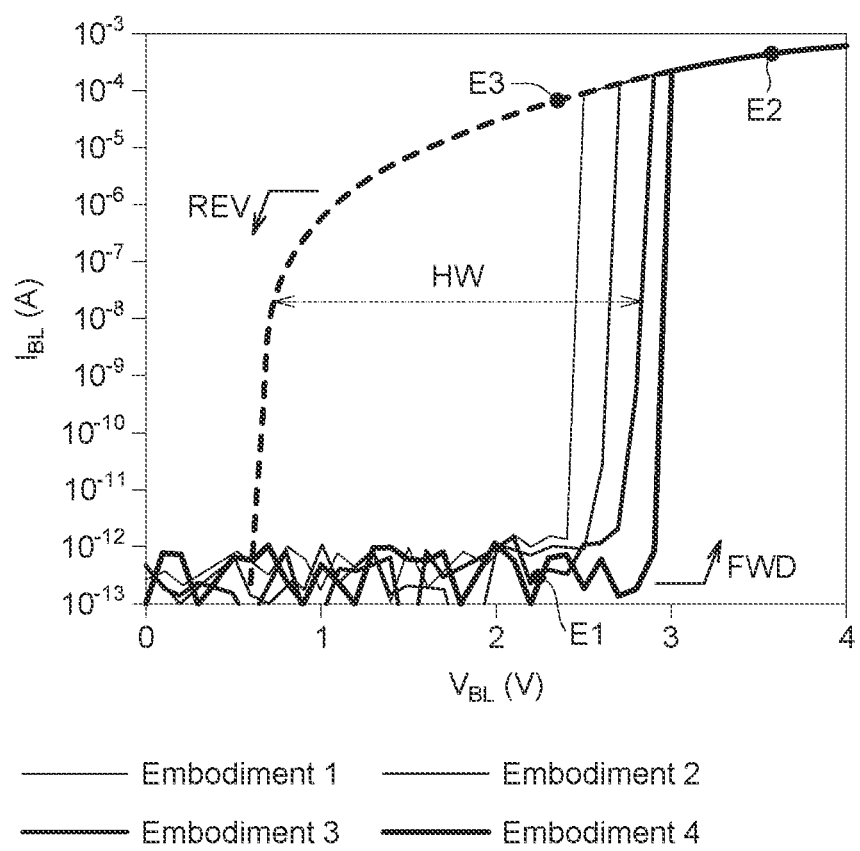
FIGS. 2 to 18 show the results of operating the memory structure as shown in FIG. 1 through a thyristor mechanism.

FIG. 2 shows the relationship between the bit line bias voltage and the bit line current (also representing the drain current) in Embodiments 1 to 4, wherein the X axis represents the bit line bias voltage ($V_{BL}$), and the unit is volts (V); the Y-axis represents the bit line current ($I_{BL}$), and the unit is amperes (A). The solid line curve represents the forward bias voltage FWD (e.g., sweeping from left to right), and the dashed curve represents the reverse bias voltage REV (e.g., sweeping from right to left). In Embodiments 1 to 4, the second gate structures 114 and the third gate structures 116 are both applied with 3V, and the first gate structures 112 are applied with different voltages. The first gate structure 112 of Embodiment 1 is applied with −3V, the first gate structure 112 of Embodiment 2 is applied with −2.5V, the first gate structure 112 of Embodiment 3 is applied with −2V, and the first gate structure 112 of Embodiment 4 is applied with −1.5V.

As shown in FIG. 2, it is firstly scanned from 0V to 4V with forward bias voltage FWD, and then is scanned from 4V to 0V with reverse bias voltage REV. Embodiments 1 to 4 show hysteresis curves respectively. The distance between the solid and dashed curves under the same bit line current represents the size of the hysteresis window. Under the same bit line current, the hysteresis windows of Embodiments 1 to 4 have different sizes. For example, under the bit line current adjacent to $10^{-8}$ A, the sizes of the hysteresis windows shown in Embodiments 1 to 2 are smaller than the size of the hysteresis window HW shown in the embodiment 3, and the size of the hysteresis window shown in the embodiment 4 is larger than the size of the hysteresis window HW shown in the embodiment 3. That is, by fixing the voltages of the second gate structure 114 and the third gate structure 116 and changing the voltage of the first gate structure 112, the size of the hysteresis window can be adjusted, so that the operation effect of the thyristor can be achieved. By reading the voltage (e.g. 2V) within the range of the hysteresis window, different current magnitudes can be obtained, so a logical "1" and a logical "0" can be distinguished.

In the traditional thyristor operation, since there is only one gate, it is usually necessary to use a complex doping structure to achieve the effect of adjusting the hysteresis window, such as forming a plurality of doped regions with different conductivity types (N-type and P-type) (e.g. N/P/N/P structure). In contrast, in the thyristor operation of the embodiments of the present application (e.g., Embodiments 1 to 4), the hysteresis curve can be adjusted by applying different gate bias voltages, and the size of the hysteresis window can be controlled without the need to form a complex doping structure.

Figure 3:
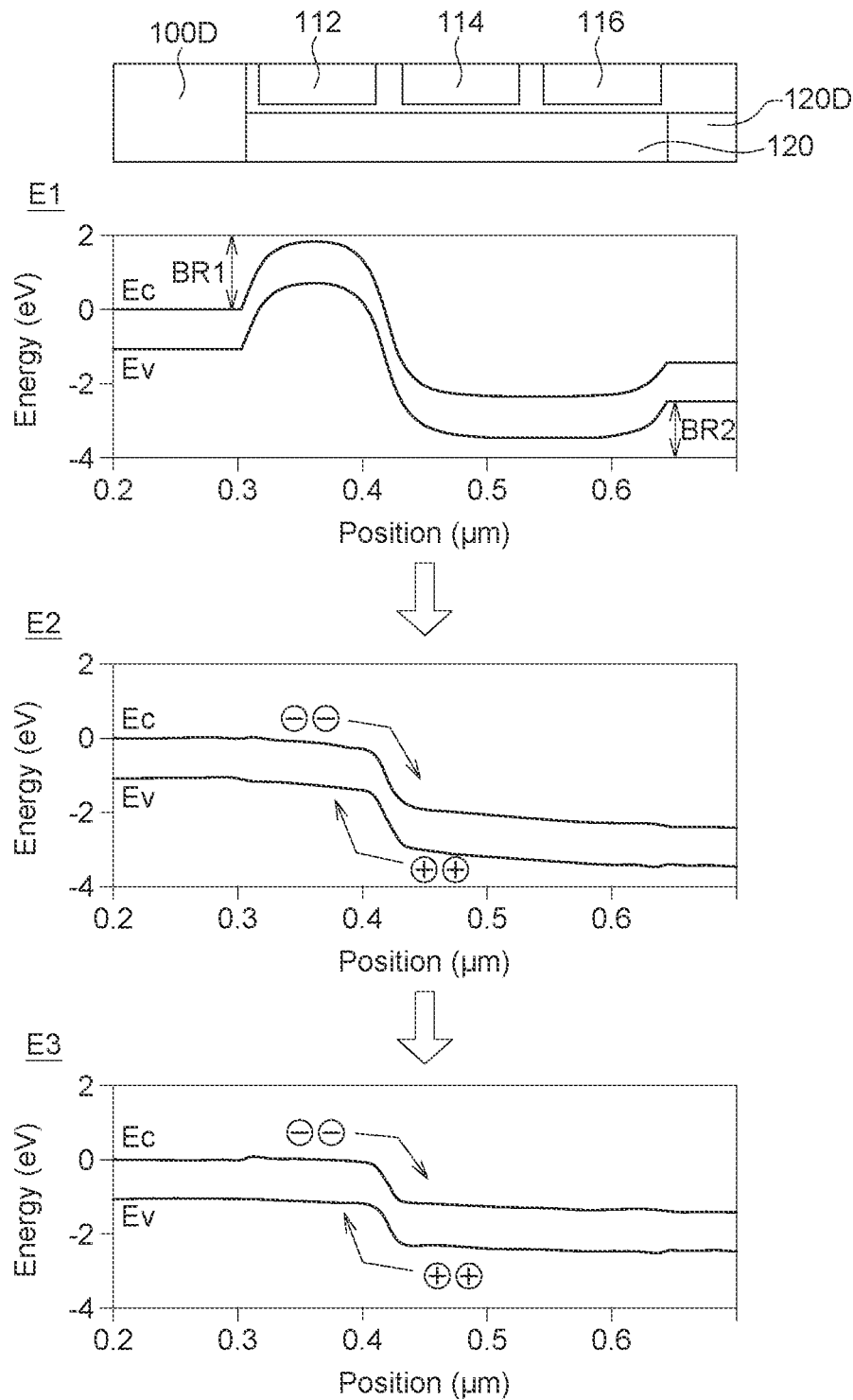

FIG. 3 shows the simulation results of the band diagrams of the first state E1 the second state E2 and the third state E3 of Embodiment 3 as shown in FIG. 2. For example, FIG. 3 can be observed by computer simulation using a Technology Computer Aided Design (TCAD) tool. In FIG. 3, the X-axis represents the position between the region 100D and the region 120D (for example, as shown in the simplified diagram with the region 100D and region 120D and other components illustrated on top of FIG. 3), the unit is micrometer (μm); the Y-axis represents the energy, the unit is electron Volt (eV). "Ec" indicates a conduction band. "Ev" indicates a valence band.

Referring to FIGS. 2 and 3 at the same time, the bias voltages of the first gate structures 112 in the first state E1 to the third state E3 are all −2V, the bias voltages of the second gate structures 114 in the first state E1 to the third state E3 are all 3V, and the bias voltages of the third gate structures 116 in the first state E1 to the third state E3 are all 3V. The first state E1 is a high resistance state, the bit line bias is 2.3V, the electron energy barrier BR1 and the hole energy barrier BR2 are both quite high, the electrons cannot pass across the electron energy barrier BR1, and the holes cannot pass across the hole energy barrier BR2.

The second state E2 is a low resistance state, and the bit e bias voltage is 3.5V. When entering the second state E2 from the first state E1, as the bit line bias voltage increases gradually, the hole energy barrier BR2 will gradually decrease, so that some holes can flow into the channel body 120 passing across the energy barrier. In this way, it also causes the reduction of the electron energy barrier BR1, so some electrons can also pass across the electron energy barrier BR1 and flow into the channel body 120. Similarly, when some electrons flow into the channel body 120, it also can cause the reduction of the hole energy barrier BR2. Thereby, a positive feedback can be formed, so that the electron energy barrier BR1 and the hole energy barrier BR2 influence each other and gradually decrease, and more electrons and holes can flow into the channel body 120. Accordingly, the electron energy barrier BR1 and the hole energy barrier BR2 in the second state E2 hardly exist, there may have a large current and the latch-up may be induced.

The third state E3 is also a low resistance state, and the bit line bias voltage is 2.3V. When entering the third state E3 from the second state E2, since the voltages of the first gate structure 112 to the third gate structure 116 are not changed, only the bit line bias voltage is changed, so the electron energy barrier BR1 and the hole energy barrier BR2 hardly exist. Accordingly, a large current is still maintained in the third state E3, and the latch-up is still maintained.

Different bias voltages listed in Table 1 below can be applied to the first gate structure 112, the second gate structure 114, the third gate structure 116, the region 120D (equipotential with the bit line BL) and the region 100D (equipotential with the source line SL) as shown in FIG. 1 for different operation modes, such as programming, erasing or reading operation modes. In the present embodiment and the accompanying drawings, "PGM" is an abbreviation for programming operation mode, which indicates an operation mode in which the memory cells of the memory structure 10 are programmed to the data state of "1" (i.e., logic "1"); "ERS" is the abbreviation of the erasing operation mode, indicating the operation mode in which the memory cells of the memory structure 10 are programmed to the data state of "0" (i.e., logic "0"); "Read" is the abbreviation of the reading operation mode, indicating the operating mode of reading the memory cells of the memory structure 10 to ascertain the voltage data state of the individual memory cells.

TABLE 1

| | first gate structure 112 (V) | second gate structure 114 (V) | third gate structure 116 (V) | bit line BL (V) | source line SL (V) |
|---|---|---|---|---|---|
| PGM | −2 | 3 | 3 | 3 | 0 |
| ERS | 0→−2 | 0→3 | 0→3 | 0 | 0 |
| Read | −2 | 3 | 3 | 2.5 | 0 |

Figure 4:
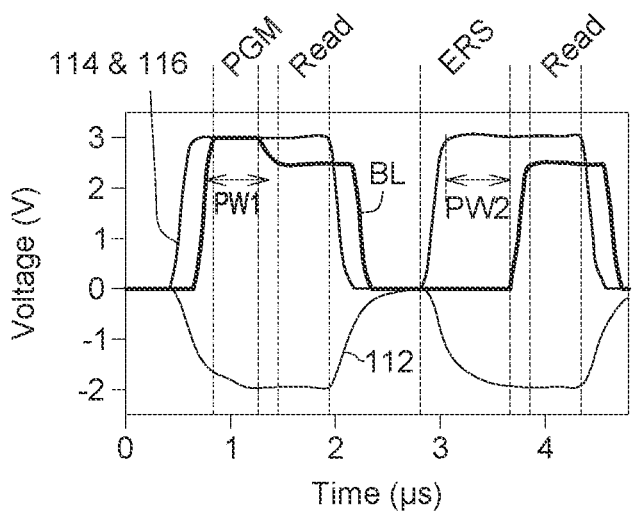

FIG. 4 is an experimental result of a program/erase cycle (P/E cycle), showing a waveform diagram of operating the memory structure 10 according to the voltages in Table 1.

Please refer to Table 1 and FIG. 4 at the same time, in "PGM", the voltage applied to the first gate structure 112 is less than 0 (e.g. −2V), the voltages applied to the second gate structure 114 and the third gate structure 116 are greater than 0 (e.g., 3V), and a large bit line bias (e.g., 3V) induces a thyristor latch-up, so the memory structure 10 begins to exhibit a low resistance state. In "ERS", in order to suppress the latch-up, the gate voltage needs to be reset, so the voltages (i.e. word line bias) applied to the first gate structure 112, the second gate structure 114 and the third gate structure 116 are returned to 0V, and a 0V bias of the bit line BL is applied. Thereafter, the voltages applied to the word lines (i.e., the first gate structure 112, the second gate structure 114 and the third gate structure 116) can be increased to return the memory structure 10 to the high resistance state. Through the above operations, a cycle of "PGM"→"Read"→"ERS"→"Read" as shown in FIG. 4 can be formed. The "PGM" and "ERS" states have pulse widths PW1 and PW2, respectively.

Figure 5:
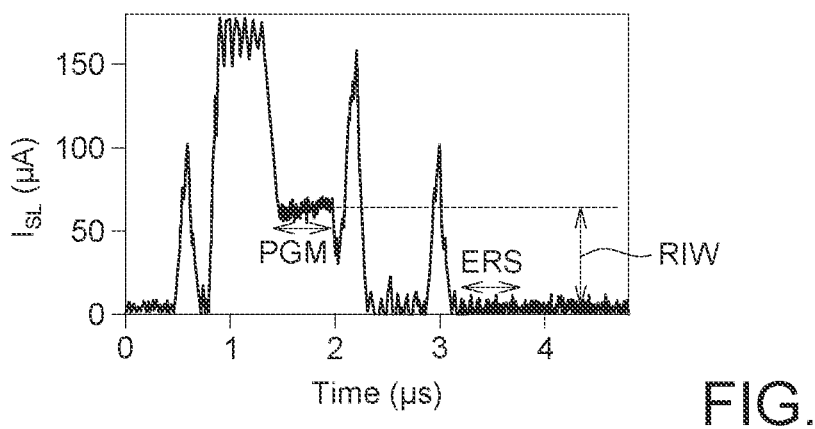

FIG. 5 shows the measurement results of the source current in different states.

Please refer to FIG. 5, the X-axis represents time, and the unit is microseconds (µs); the Y-axis represents source current ($I_{SL}$), and the unit is microamperes (µA). The read current window RIW between the "PGM" state and the "ERS" state may be greater than 60 microamperes. This large read current window can be attributed to the large hysteresis window.

Figure 6:
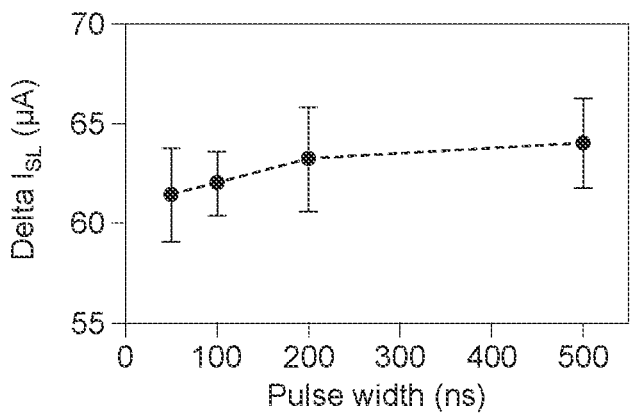

FIG. 6 is a graph showing the relationship between the variation of the source current and the pulse width.

Please refer to FIG. 6, the X-axis represents the pulse width, and the unit is nanoseconds (ns); the Y-axis represents the variation of the source current (delta $I_{SL}$) (i.e., the current window), and the unit is microamperes (µA). The sensing margin of the current window of 60 microamperes can be preserved even when the pulse width is reduced to 50 nanoseconds (the measurement limit).

Figure 7:
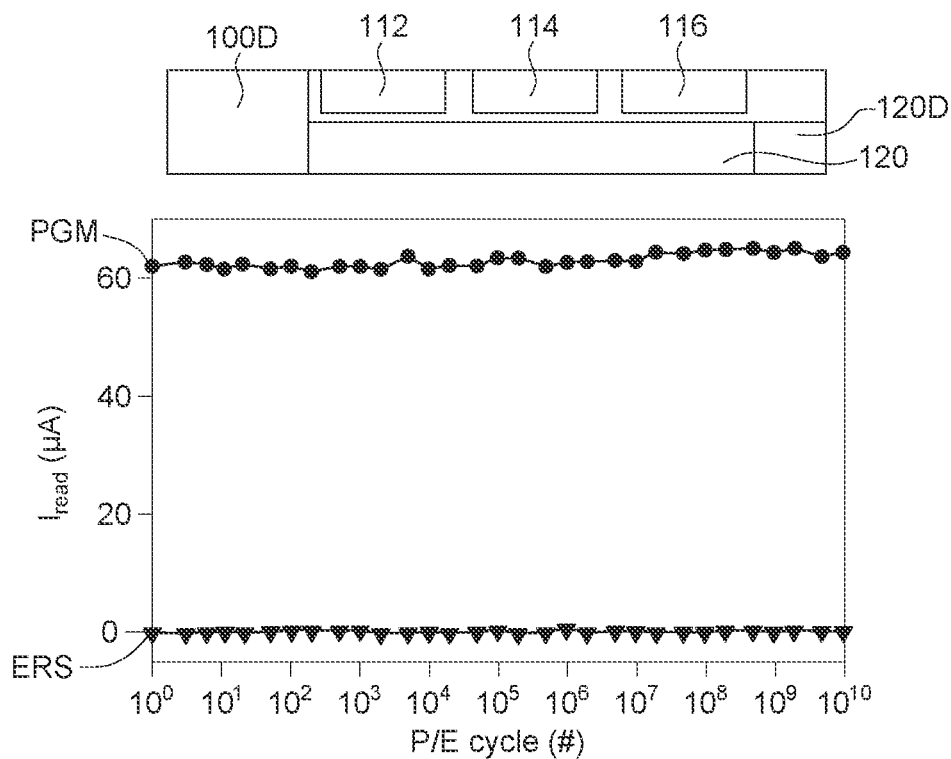
Figure 8:
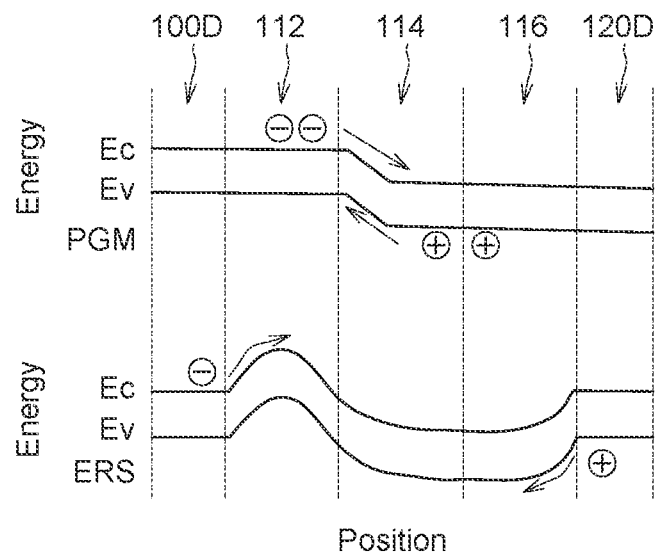
Figure 9:
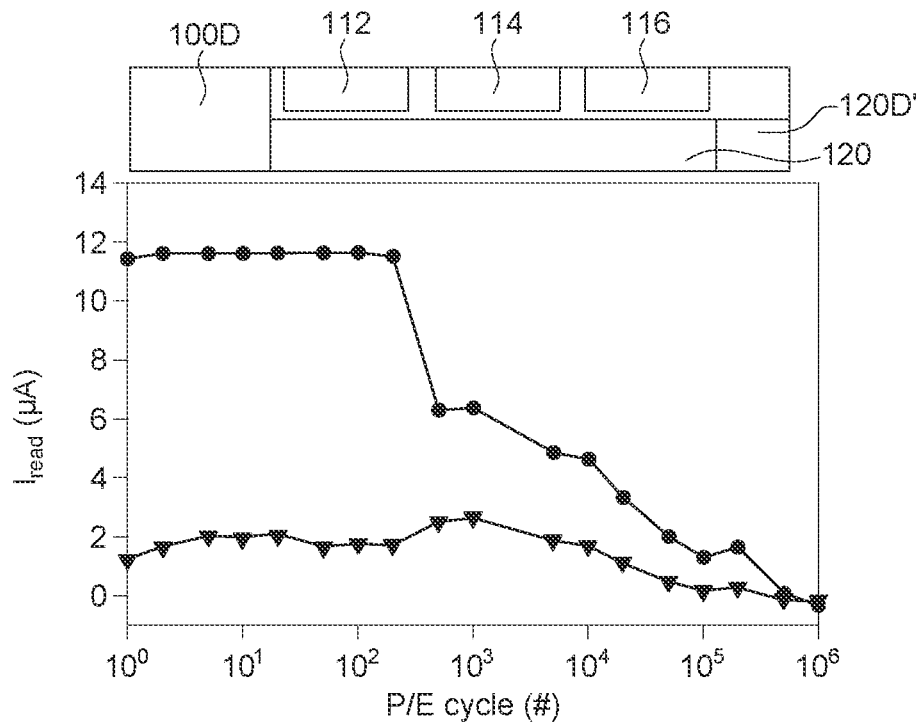
Figure 10:
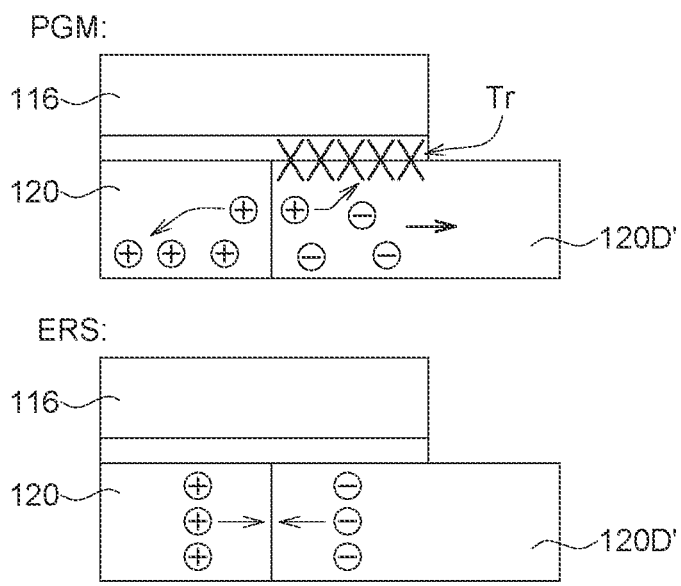

FIG. 7 shows the endurance according to Embodiment A of the present invention. FIG. 8 shows the band diagram of the "PGM" state and the "ERS" state of Embodiment A. FIG. 9 shows the endurance according to Comparative Example A. FIG. FIG. 10 is a schematic diagram of the electron/hole transfer states in the "PGM" state and the "ERS" state of Comparative Example A.

The Embodiment A can be applied to the memory structure 10 as shown in FIG. 1, using the thyristor as the operating mechanism. The difference between the Comparative Example A and the Embodiment A is that the region 120D' serving as the drain and the region 100D serving as the source in Comparative Example A have the same first conductivity type, and also are highly doped N-type (N+), for example, using the floating body cell as the operating mechanism.

Please refer to FIG. 7, the X-axis represents the number of P/E cycles, and the Y-axis represents the read current ($I_{read}$) in microamperes (µA). During the operation of the P/E cycle, since hot carriers are not used for operation in the present invention, the memory structure of the present invention will not be damaged by hot carriers. In comparison with a comparative example in which hot carrier are used for operating (for example, Comparative Example A), the memory structure of the present invention has more excellent endurance, and there is no difference between the read currents in the "PGM" state and the "ERS" state up to $10^{10}$ P/E cycles.

Please refer to FIG. 8, in the "PGM" operation, for example, applying 0V to the region 100D and applying 3V to the region 120D, the above-mentioned positive feedback can be used to reduce or eliminate the electron energy barrier and the hole energy barrier, and no hot carrier is involved in the operation. Since the barrier has been eliminated, electrons and holes can move toward the middle of the channel body 120. In the "ERS" operation, in order to restore the electron energy barrier and the hole energy barrier, for example, 0V is applied to the region 1000, 0V is applied to the region 120D, and the voltages listed in table 1 are applied to the first date structure 112 to the third gate structure 116, and no hot carrier is involved in the operation, either. Since the energy barrier has been established, electrons and holes cannot move to the channel body 120.

Please refer to FIG. 9, the X-axis represents the number of P/E cycles, and the Y-axis represents the read current in microamperes (µA), In the operation of the P/E cycle, since the Comparative Example A uses the floating body cell as the operating mechanism and uses hot carriers for operation, the memory structure is more likely to be damaged by the hot carriers. For example, in the "PGM" operation, the Comparative Example A uses band to band tunneling to generate holes, and the holes are stored in the channel body 120. However, in the "PGM" state, when the read current is still less than $10^3$, the P/E cycle drops rapidly, and it can be seen that the endurance of Comparative Example A is significantly worse than the endurance of Embodiment A.

Please refer to FIG. 10, in the "PGM" operation, for example, 1V is applied to the third gate structure 116, and 5V is applied to the region 1201Y to generate holes (i.e., hot carriers) through the band-to-band tunneling mechanism, and causing an interface trap Tr. As a result, the electric field is reduced, and the read current of Comparative Example A in the "PGM" state is smaller than the read current of Embodiment A in the "PGM" state. In the "ERS" operation, for example, 4V is applied to the third date structure 116 and −5V is applied to the region 120D', so that the holes stored in the channel body 120 are moved out of the channel body 120.

Figure 11:
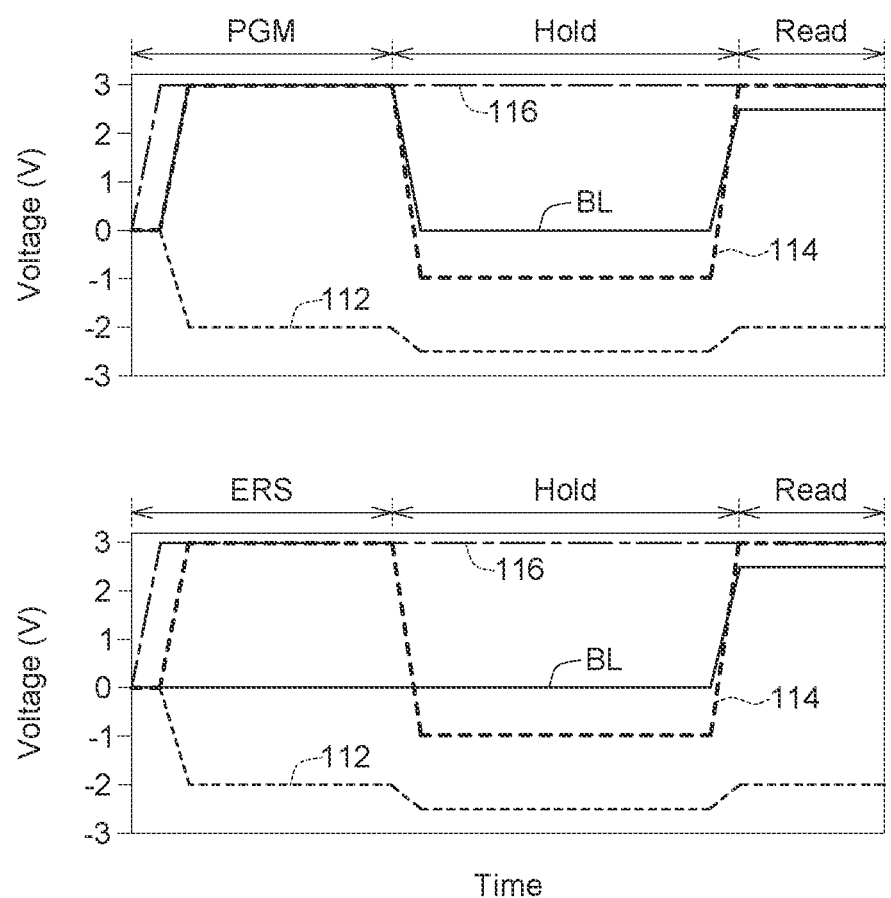
Figure 12:
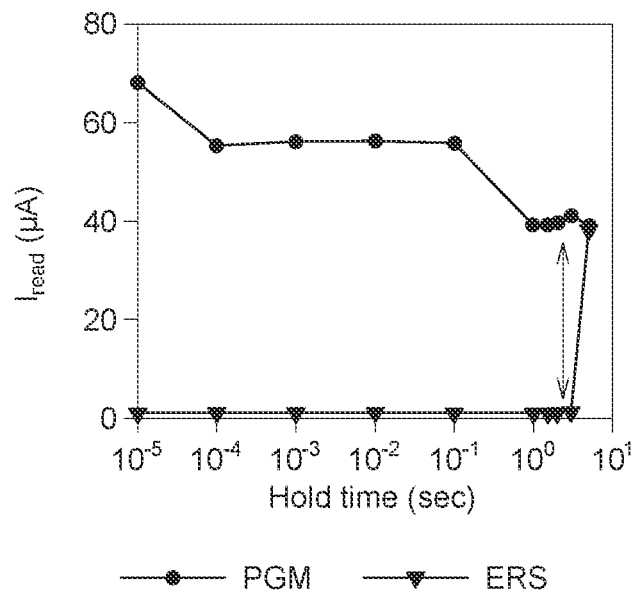
Figure 13:
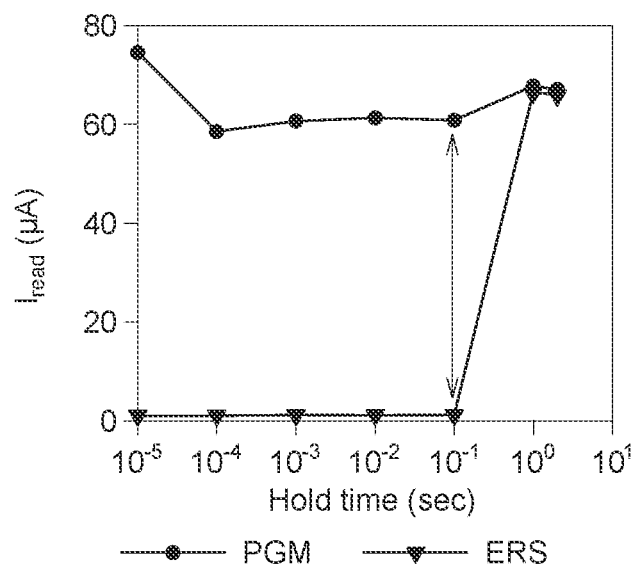

FIGS. 11-13 illustrate a hold state of a memory structure (e.g., the memory structure 10) according to an embodiment of the present invention based on a thyristor-based operating mechanism.

The operation mode of the memory structure 10 may further include a hold operation. "Hold" is an abbreviation for the hold operation, indicating an operation mode for maintaining the voltage data state of the memory cells of the memory structure 10.

Please refer to FIG. 11, which shows the relationship between time and voltage of the bit line BL, the first gate structure 112, the second gate structure 114 and the third gate structure 116 in different states, "Hold" can be performed after "PGM" or "ERS" is completed, and "Read" can be performed after "Hold" is completed. When operating "Hold" different voltages can be applied to the first gate structure 112 to the third gate structure 116 to maintain the state of "PGM" or "ERS", for example, −2.5V can be applied to the first gate structure 112, −1V can be applied to the second gate structure 114, 3V can be applied to the third gate structure 116, and 0V can be applied to the bit line BL.

Please refer to FIG. 12, which shows the relationship between the hold time and the read current ($I_{read}$) in "PGM" and "ERS" at room temperature, the X axis represents the hold time, the unit is second (sec); the Y axis represents the read current in microamps (µA). For example, at room temperature, when the hold time is 3 seconds, the difference in read current between "PGM" and "ERS" can still maintain 40 microamps, as shown by the double arrow in FIG. 12.

Please refer to FIG. 13, which shows the relationship between the hold time and the read current in "PGM" and "ERS" at 85° C. The X-axis represents the hold time, in seconds (sec); the Y-axis represents read current ($I_{read}$) in microamps (μA). For example, at 85° C., when the hold time is $10^{-1}$ seconds (i.e. 100 ms), the difference in read current between "PGM" and "ERS" can still maintain 60 microamps, as shown in FIG. 13 as shown by the double arrow.

It can be seen from the results in FIGS. 12 to 13 that, whether at room temperature or 85° C.; as long as a suitable hold bias is applied, the memory structure of the present invention can have a reasonable hold time (for example, 3 s or 100 ms), which are superior to the DRAM currently used in the industry (the hold time is, for example, 64 ms).

FIGS. 14-18 illustrate the results of read disturb of a memory structure (e.g., memory structure 10) according to an embodiment of the present invention based on a thyristor-based operating mechanism. Read disturb can be used to detect how long the read time can be maintained during the "Read" process, and the data is not damaged.

Generally speaking, the 1T1C DRAM currently used in the industry belongs to destructive read, that is, after the "Read" is completed, the state will disappear and need to be rewritten.

Figure 14:
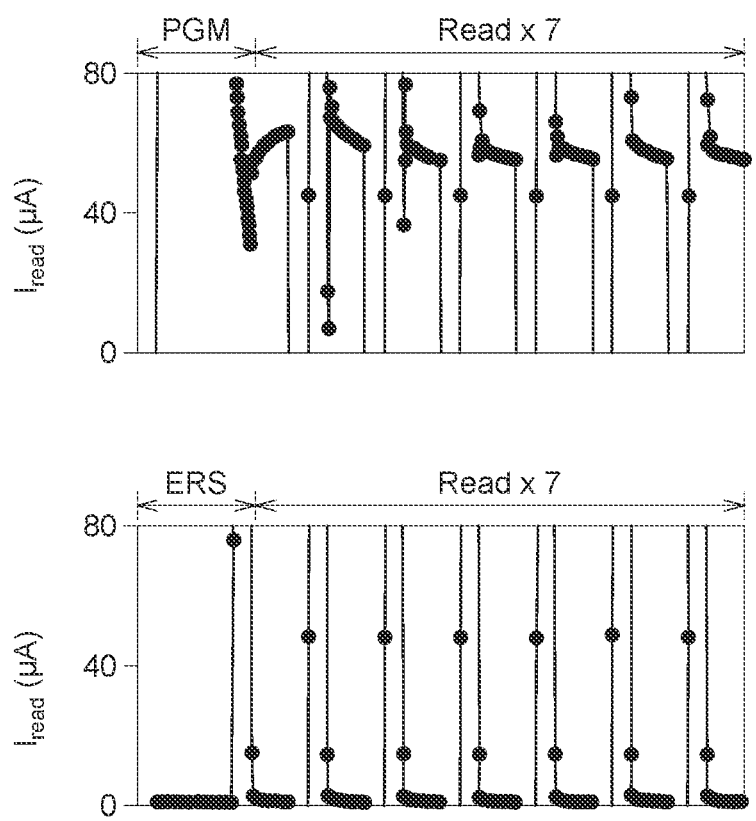

Please refer to FIG. 14, which shows that in the memory structure of the present invention, the data can be read repeatedly (for example, 7 times of consecutive "Read") without rewriting, which proves that the memory structure of the present invention belongs to non-destructive read.

Figure 15:
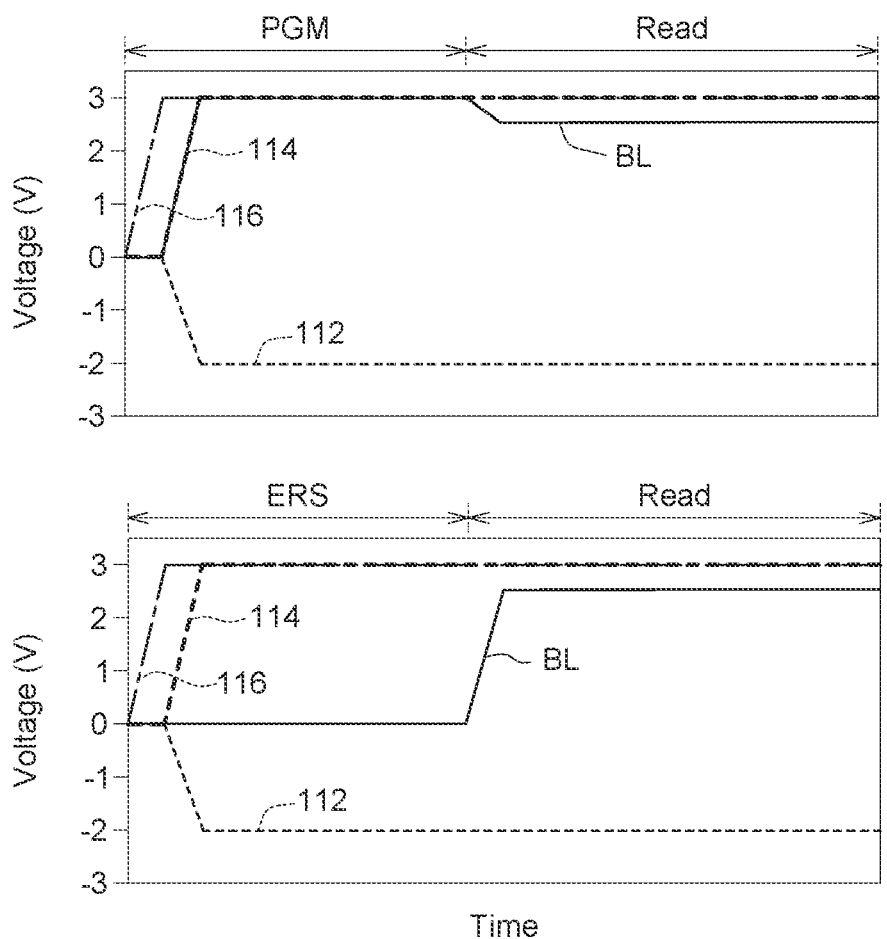

Please refer to FIG. 15, which shows the results of continuous reading after "PGM" and "ERS", for example, prolonging the time of "Read" to measure how long the "Read" can be lasted while the data still existing.

Figure 16:
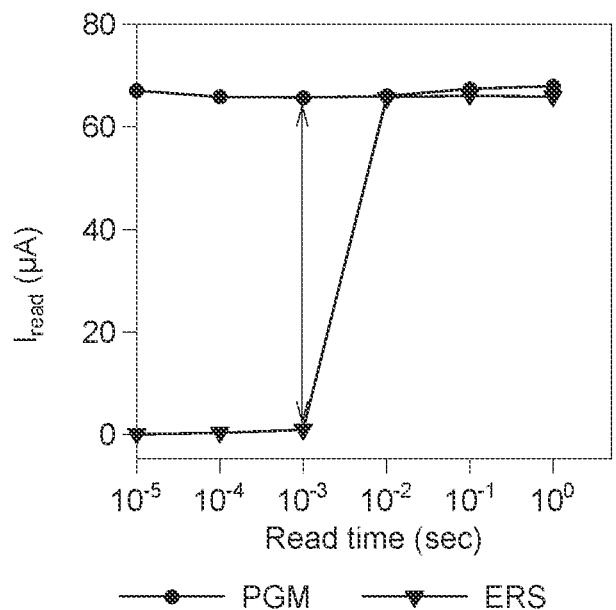

Please refer to FIG. 16, which shows the relationship between the read time and the read current of "PGM" and "ERS" when the bit line read voltage (Read $V_{BL}$) is 2.5V, where the X-axis represents read time in seconds (sec); the Y-axis represents read current ($I_{read}$) in microamperes (μA). When the read time is $10^{-3}$ seconds (i.e. 1 ms), the read current difference between "PGM" and "ERS" remained at 65 microamps, as shown by the double arrow in FIG. 16, When the read time is greater than 1 ms, due to the positive feedback, the current of "ERS" rises rapidly and increases to the same current as the current of "PGM".

Figure 17:
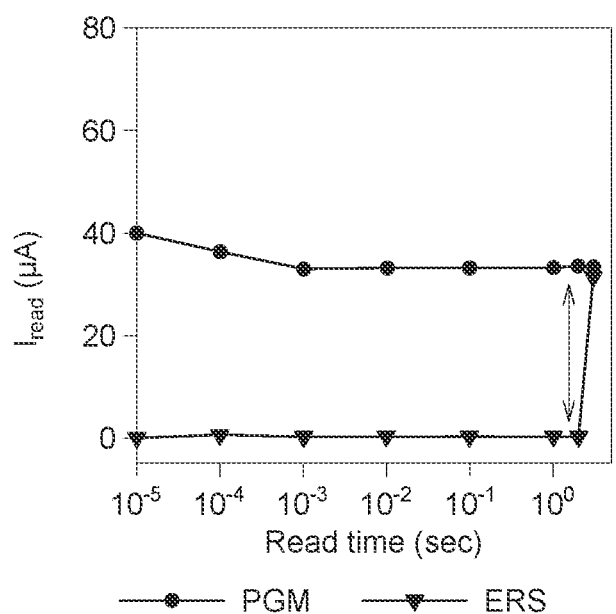

Please refer to FIG. 17, which shows the relationship between the read time and the read current of "PGM" and "ERS" when the read voltage of the bit line is 2.1V, wherein the X-axis represents the read time in seconds (sec); Y-axis represents the read current ($I_{read}$) in microamperes (μA). When the read time is 2 seconds, the read current difference between "PGM" and "ERS" is remained at 33 microamperes, as shown by the double arrow in FIG. 17. When the read time is greater than 2 seconds, the current of "ERS" rises rapidly due to the positive feedback, and increases to the same current as the current of "PGM". Compared with the embodiment of FIG. 16, although the difference in read current between "PGM" and "ERS" in the embodiment of FIG. 17 is smaller, the read time can be maintained longer.

Figure 18:
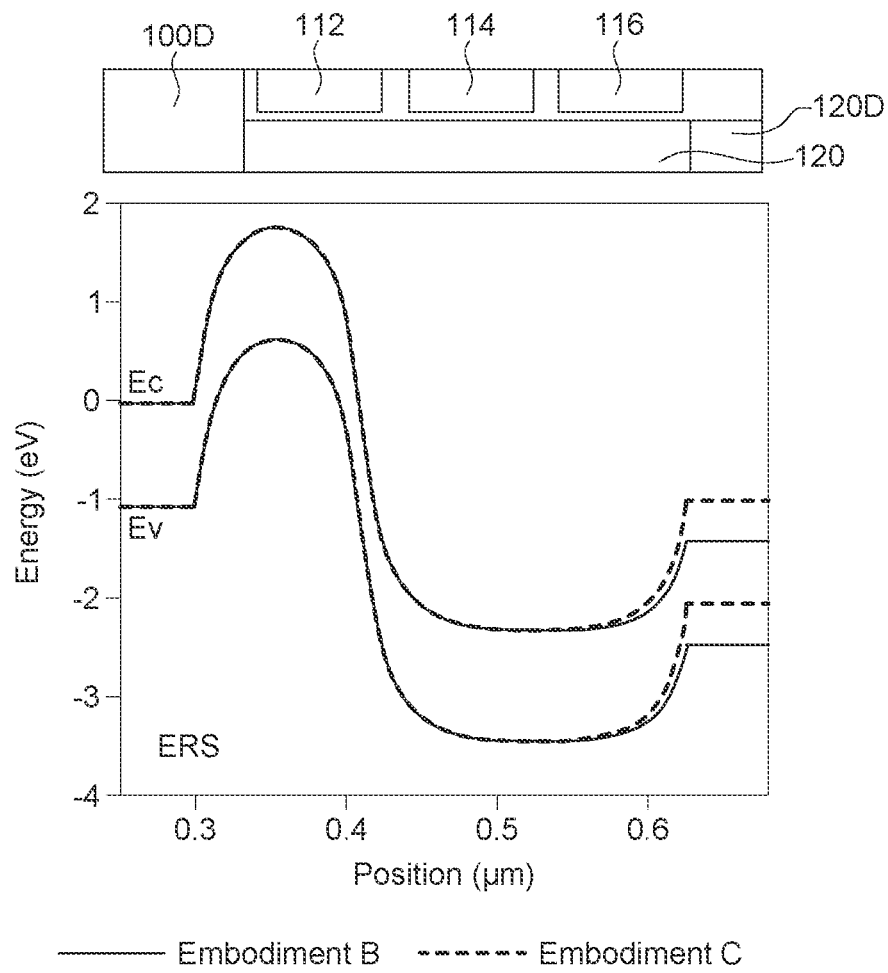

Please refer to FIG. 18, which shows the band diagram of the read voltage of the bit line in the "ERS" state of the embodiment B and the embodiment C. The structures of the embodiment B and the embodiment C are the same as the structure of the embodiment A, but the read voltages of the bit lines of the embodiment B and the embodiment C are different. In Embodiment B, the read voltage of the bit line is 2.5V. In Embodiment C, the read voltage of the bit line is 2.1V. As shown in FIG. 18, the lower read voltage of the bit line (i.e., Embodiment C) can increase the hole energy barrier, and it is less likely for the holes to pass across the energy barrier to generate leakage current, so the time for generating the positive feedback can be delayed.

Therefore, if the read-disturb-free time is to be extended, the read voltage of the bit line can be reduced, so that the probability of inducing positive feedback in the "ERS" is reduced.

Figure 19:
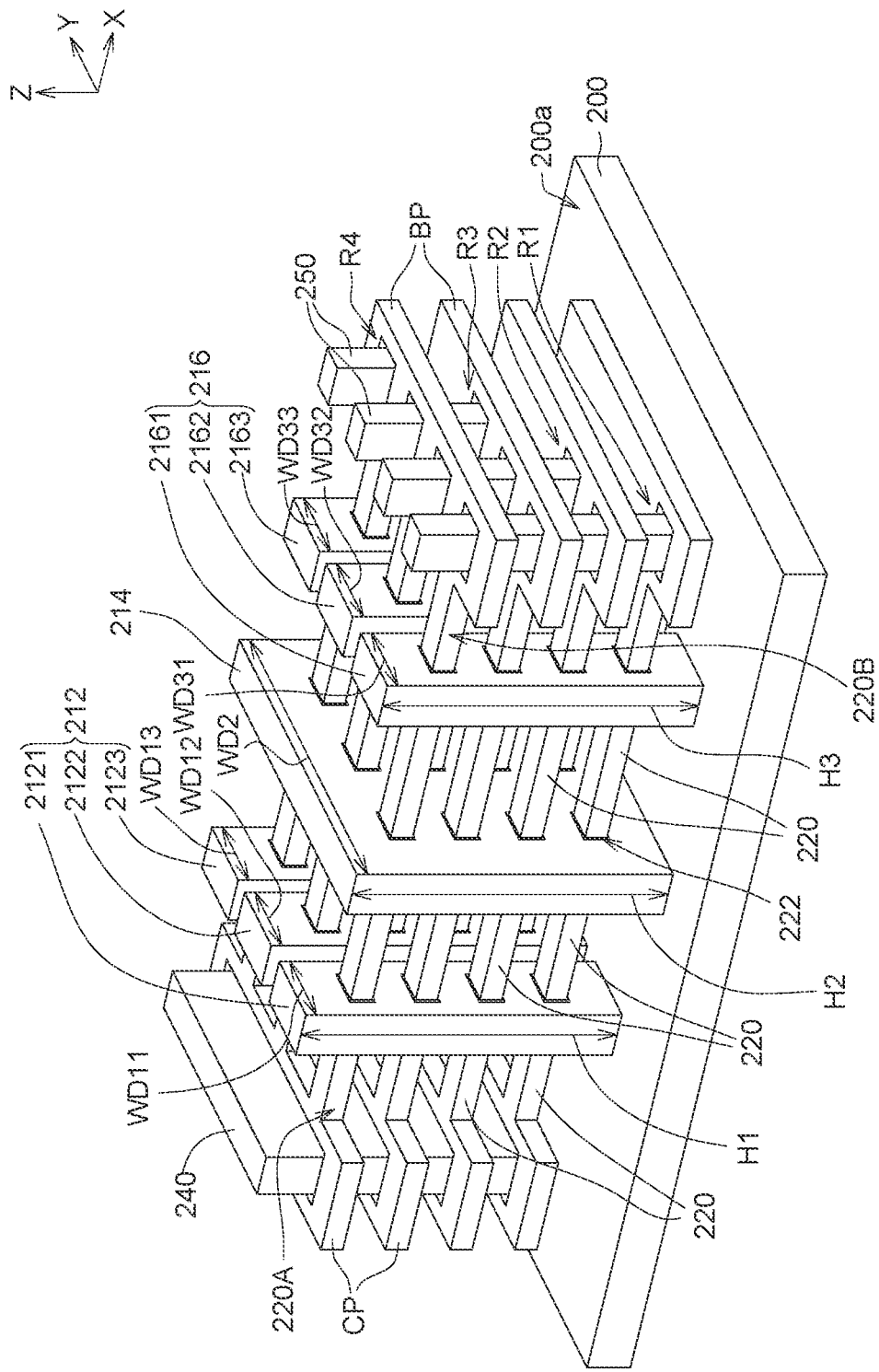
FIG. 19 is a schematic stereogram of a memory structure according to another embodiment of the present invention.

FIG. 19 is a schematic stereogram of a memory structure 20 according to another embodiment of the present invention. In the present embodiment, Z direction represents a third direction, Y direction represents a second direction, and X direction represents a first direction, as shown in FIG. 19.

Referring to FIG. 19, the memory structure 20 includes a substrate 200, a first gate structure 212, a second gate structure 214, a third gate structure 216, a plurality of channel bodies 220, a plurality of dielectric films 222, a first side plug 240, a second side plug 250, a plurality of first side pads CP and a plurality of second side pads BP. The substrate 200 has an upper surface 200a, the upper surface 200a is parallel to the first direction (e.g. X direction) and the second direction (e.g. Y direction), and the normal direction of the upper surface 200a is parallel to the third direction (e.g. Z direction).

The first gate structure 212, the second gate structure 214, and the third gate structure 216 are disposed on the substrate 200 along a first direction (e.g., X direction), and are separated from each other along the first direction (e.g., X direction), and extend along the second direction (e.g., Y direction) and the third direction (e.g., Z direction), wherein the second gate structure 214 is disposed between the first gate structure 212 and the third gate structure 216. The first direction, the second direction and the third direction are intersected with each other, for example, perpendicular to each other, that is, the Z direction, the Y direction and the X direction may be perpendicular to each other. The first gate structure 212 includes a first island structure 2121, a second island structure 2122 and a third island structure 2123, the first island structure 2121, the second island structure 2122 and the third island structure 2123 respectively extend along the third direction, and are separated from each other along a second direction. The third gate structure 216 includes a fourth island structure 2161, a fifth island structure 2162 and a sixth island structure 2163, the fourth island structure 2161, the fifth island structure 2162 and the sixth island structure 2163 respectively extend along the third direction, and are separated from each other along a second direction. Moreover, the first island structure 2121, the second island structure 2122 and the third island structure 2123 are independently controlled. The fourth island structure 2161, the fifth island structure 2162 and the sixth island structure 2163 are independently controlled.

In one embodiment, a height H1 of the first island structure 2121, the second island structure 2122, or the third island structure 2123 in the third direction is equal to a height H2 of the second gate structure 214 in the third direction. A width WD11, WD12 or WD13 of the first island structure 2121, the second island structure 2122 or the third island structure 2123 in the second direction is smaller than a width WD2 of the second gate structure 214 in the second direction. A height H3 of the fourth island structure 2161, the fifth island structure 2162 or the sixth island structure 2163 in the third direction is equal to a height H2 of the second gate structure 214 in the third direction. A width WD31, WD32 or WD33 of the fourth island structure 2161, the fifth island structure 2162, or the sixth island structure 2163 in the second direction is smaller than a width WD2 of the second gate structure 2162 in the second direction, but the present invention is not limited thereto. In order to make the drawing more concise, some insulating materials are omitted in FIG. 19, for example, the insulating materials between the substrate 200, the first gate structure 212, the second gate structure 214 and the third gate structure 216, the insulating materials between the first island structure 2121, the second island structure 2122 and the third island structure 2123, the insulating materials between the fourth island structure 2161, the fifth island structure 2162 and the sixth island structure 2163 are omitted. The width WD11, WD12 or WD13 of the first island structure 2121, the second island structure 2122 or the third island structure 2123 in the second direction may be equal to the width WD31, WD32 or WD33 of the fourth island structure 2161, the fifth island structure 2162 or the sixth island structure 2163 in the second direction. In some embodiments, the first gate structure 212, the second gate structure 214 and the third gate structure 216 may each serve as a word line.

The channel bodies 220 are separated from each other along the second direction (e.g., Y direction) and the third direction (e.g., Z direction) and pass through the first gate structure 212, the second gate structure 214 and the third gate structure 216 along the first direction (e.g., X direction), that is, the extending direction of the channel bodies 220 is parallel to the upper surface 200a of the substrate 200, to form a horizontal channel structure. Each of the channel bodies 220 has a first end 220A and a second end 220B, the first end 220A is adjacent to the first gate structure 212 and farther away from the third gate structure 216, and the second end 220E is adjacent to the third gate structure 216 and farther away from the first gate structure 212, and the second end 220E is opposite to the first end 220A.

The first side pads CP are stacked along the third direction (e.g., Z direction) and separated from each other along the third direction (e.g., Z direction), and each of the first side pads CP is connected to the corresponding first end 220A in the channel bodies 220. The second side pads BP are stacked along the third direction (e.g., Z direction) and separated from each other along the third direction (e.g., Z direction), and each of the second side pads BP is connected to the corresponding second end 220B in the channel bodies 220. A dopant can be doped in the first side pads CP and the second side pads BP.

In the present embodiment, the thyristor is used as the operating mechanism, the first side pads CP have a first conductivity type, for example, having a high concentration of N-type doping (N+); the second side pads BP have a second conductivity type, for example, having a high concentration of P-type doping (P+).

In one embodiment, the first side pad CP can be used as a source, and the second side pad BP can be used as a drain, but the invention is not limited thereto.

The dielectric films 222 are disposed between the first gate structure 212 and the channel bodies 220, between the second gate structure 214 and the channel bodies 220, and between the third gate structure 216 and the channel bodies 220. That is, the dielectric films 222 extend along the first direction (e.g., X direction) and surround the side surfaces of the channel bodies 220 to separate the first gate structure 212 from the channel bodies 220, separate the second gate structure 214 from the channel bodies 220, and also separate the third gate structure 216 from the channel bodies 220. In one embodiment, the dielectric films 222 surrounding different channel bodies 220 are connected to each other, extend along the second direction (e.g., Y direction) and the third direction (e.g., Z direction), covering the first gate structure 212, the second gate structure 214 and the third gate structure 216 (not shown).

The first gate structure 212 the second gate structure 214 and the third gate structure 216 surround each of the dielectric films 222 and each of the channel bodies 220, and also extend into the space between adjacent channel bodies 220 along the second direction (e.g., Y direction) and the third direction (e.g., Z direction). Since the first gate structure 212, the second gate structure 214 and the third gate structure 216 surround the side surfaces of the corresponding positions (i.e. the intersection positions between the first gate structure 212, the second gate structure 214, the third gate structure 216 and the channel bodies 220) of the channel bodies 220, it is also called a gate-ail-around (GAA) structure. Moreover, each of channel bodies 220 can be controlled by three gates (i.e., the first gate structure 212, the second gate structure 214 and the third gate structure 216). Specifically, the channel bodies 220 corresponding to the first island structure 2121 can be controlled by the first island structure 2121, the second gate structure 214 and the fourth island structure 2161; the channel bodies 220 corresponding to the second island structure 2162 can be controlled by the second island structure 2162, the second gate structure 214 and the fifth island structure 2162; the channel bodies 220 corresponding to the third island structure 2123 can be controlled by the third island structure 2123, the second gate structure 214 and the sixth island structure 2163. A transistor is formed at each of the intersection positions between the channel bodies 220 and each of the gate structures.

The first side plug 240 extend along the second direction (e.g., Y direction) and the third direction (e.g., Z direction), and are in electrical contact with the substrate 200 and the first side pads CP. For example, the first side plug 240 is electrically connected to the substrate 200 and the channel bodies 220.

The second side plugs 250 are separated from each other along the second direction (e.g., Y direction), and respectively extend along the third direction (e.g., Z direction) to electrically contact a plurality of landing regions R1 to R8 on the second side pads BR In the present embodiment, heights of the second side plugs BP in the third direction (e.g., Z direction) gradually increases along the second direction (e.g., Y direction), and the landing regions R1 to R8 form a stepped structure. However, the present invention is not limited thereto. The top portions of the second side plugs 250 can be respectively connected to a bit line (not shown). Different second side plugs 250 are connected to different bit lines (not shown). That is, the channel bodies 220 in the same layer can be electrically connected to the same second side plug 250 and the corresponding bit line (not shown). The number of the second side plugs 250 can be respectively the same as the number of the first side pads CP, the number of the channel bodies 220 and the number of the second side pads BP along the third direction (e.g., Z direction), such as 4, but the present invention is not limited thereto. For example, in other embodiments, the number of the second side plugs 250, the number of the first side pads CP along the third direction (e.g., Z direction), the number of the channel bodies 220 along the third direction (e.g., Z direction) and the number of the second side pads BP along the third direction (e.g., Z direction) may be greater than 4.

In some embodiments, the substrate 200 may include a semiconductor substrate, such as a bulk silicon substrate. In the present embodiment, the channel bodies 220 may be formed by an epitaxial growth process, and the material of the channel bodies 220 may include monocrystalline silicon.

During operation (e.g., programming or erasing) of the memory device 20, the channel bodies 220 may be used to store carriers (e.g., electrons or holes). The dielectric films 222 do not need to have the function of storing carriers (e.g., electrons or holes), so the dielectric films 222 do not include a charge storage structure, such as an oxide-nitride-oxide (ONO) structure. In other words, there is no ONO structure in the space between the channel bodies 220 and the gate structures (i.e., the first gate structure 212, the second gate structure 214 and the third gate structure 216). In one embodiment, the material of the dielectric films 222 includes a dielectric material, such as oxide, and the dielectric film 222 may be a single-layer structure. In one embodiment, the material of the dielectric film 222 may include a high dielectric constant material (high-k material). In one embodiment, the material of the first side plug 240, the second side plugs 250, the first side pads CP, the second side pads BP, the first gate structure 212, the second gate structure 214, and the third gate structure 216 may include semiconductor material or metal material. In one embodiment, the material of the first side pads CP, the second side pads BP, the first gate structure 212, the second gate structure 214 and the third gate structure 216 may include monocrystalline silicon or polycrystalline silicon or metal. It should be understood that the materials of the above-mentioned elements of the present invention are not limited thereto.

According to some embodiments, the memory structure 20 may be formed by a stacked gate-all-around nanosheet CMOS process. Compared with the memory structure 10 with vertical channels, the memory structure 20 with horizontal channels can have more layers of channel bodies 220 being stacked, so more bits can be formed, and the memory structure 20 with horizontal channels can have higher density of memory cells, and it is more beneficial to the miniaturization of the size of the memory structure.

In a Comparative Example B (not shown), the shape of the first gate structure 212 is the same as the shape of the second gate structure 214 (that is, the first gate structure 212 does not include the first island structure 2121, the second island structure 2122 and the third island structure 2123), and other structures of Comparative Example B are the same as structures of the memory structure 20 (that is, the third gate structure 216 also includes the fourth island structure 2161 to the sixth island structure 2163). Compared with Comparative Example B (not shown), since the memory structure 20 of the present invention includes separate island-like structures in the first gate structure 212 and the third gate structure 216, when the memory structure is operated by the thyristor mechanism, it has better control effect and shows more excellent electrical characteristics. For example, in one embodiment of the present application, the island structures separated in both of the first gate structure 212 and the third gate structure 216 can provide more flexible operation design of writing and erasing voltages, which helps to improve the memory window between the "1" the "0" states, and also helps to suppress leakage currents from unselected memory cells.

Figure 20:
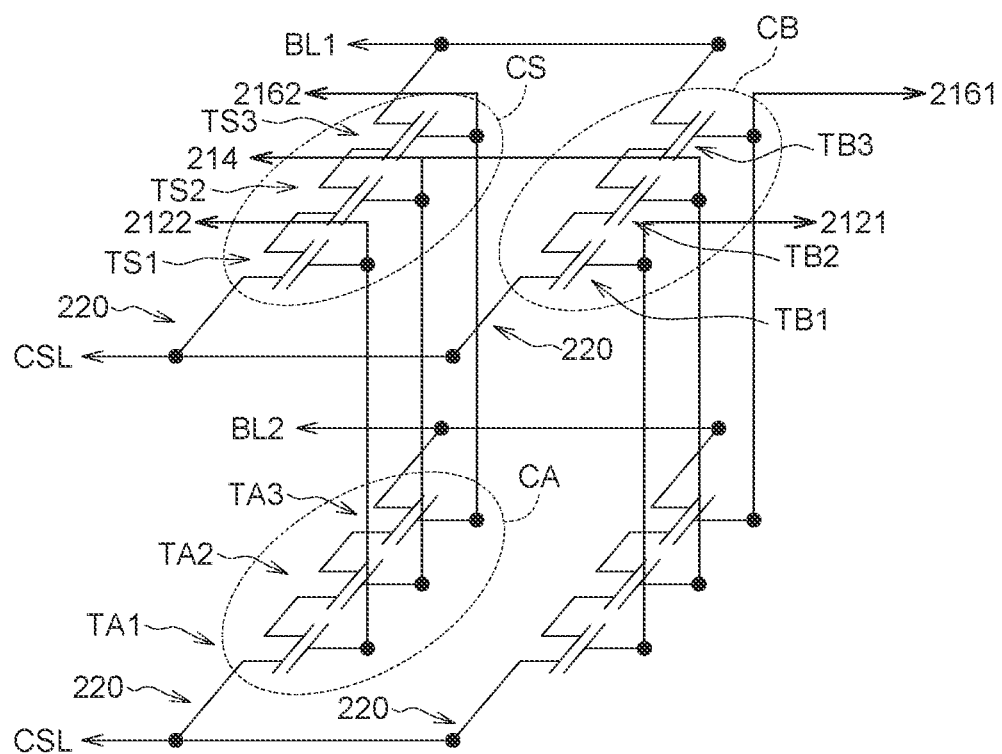
FIG. 20 is an equivalent circuit diagram of a memory structure according to another embodiment of the present invention.

FIG. 20 shows an equivalent circuit diagram of the memory structure according to another embodiment of the present invention.

Referring to FIGS. 19 and 20 at the same time, FIG. 20 exemplarily shows four adjacent channel bodies 220 in FIG. 19, for example, a transistor is formed at each of intersection positions between the channel bodies 220, the first island structure 2121 and the second island structure 2122 in the first gate structure 212, the second gate structure 214 and the fourth island structure 2161 and the fifth island structure 2162 in the third gate structure 216. As shown in FIG. 20, the transistors TA1, TA2 and TA3 connected by the same channel body 220 together form a memory cell unit CA; the transistors TB1, TB2 and TB3 connected by the same channel body 220 together form a memory cell unit CB; the transistors TS1, TS2 and TS3 connected by the same channel body 220 together form a memory cell Unit CS. The first ends 220A of the channel bodies 220 are connected to the corresponding first side pads CP, The first side pads CP of different layers are electrically connected to a first side plug 240 and are electrically connected to a source line. Therefore, the memory cells CA, CB and CS are connected to a common source line CSL (i.e., equipotential). The second ends 220B of the channel bodies 220 are connected to the corresponding second side pads BP, different layers of the second side pads BP electrically contact different second side plugs 250, and the different second side plugs 250 are respectively electrically connected to different bit lines, for example, the memory cells CB and CS in the same layer are electrically connected to the first bit line BL1, and the memory cells CA is electrically connected to the second bit line BL2. The memory cells CA, CB and CS share the second gate structure 214. The memory cells CA and CS share the second island structure 2122 in the first gate structure 212 and the fifth island structure 2162 in the third gate structure 216.

In the present embodiment, the memory cell unit CS is the selected memory cell unit, and other memory cell units CA and CB are unselected memory cell units (e.g., inhibited memory cell units). In other words, the memory cell CS corresponds to the selected second island structure 2122, the selected second gate 214 and the selected fifth island structure 2162, and is electrically connected to the selected first bit line BL1. The unselected memory cell CB may correspond to the unselected first island structure 2121 and the unselected fourth island structure 2161. The second bit line BL2 is an unselected bit line. In addition, different bias voltages can be applied to the first island structure 2121, the second island structure 2122, the second gate structure 214, the fourth island structure 2161, the fifth island structure 2162, the first bit line BL1, the second bit line BL2 and the common source line CSL for different operation modes, such as "PGM", "ERS" or "Read" operation modes similar to those described in the relevant paragraphs of Table 1.

TABLE 2

| | PGM | ERS | Read |
|---|---|---|---|
| second island structure 2122 (V) | −2 | −2 | −2 |
| second gate structure 214 (V) | 3 | 3 | 3 |
| fifth island structure 2162 (V) | 3 | 3 | 3 |
| first bit line BL1 (V) | 3 | 0 | 2.5 |
| first island structure 2121 (V) | −2 | 0 | −2 |
| fourth island structure 2161 (V) | 5 | 0 | 5 |
| second bit line BL2 (V) | 1.4 | 1.4 | 0 |
| common source line CSL (V) | 0 | 0 | 0 |

Figure 21:
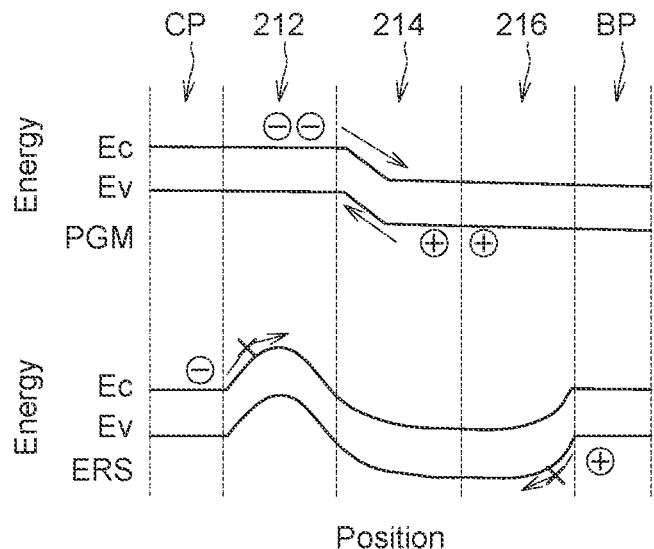
FIG. 21 shows a band diagram for operating the memory structure in the "PGM" state and the "ERS" state based on the thyristor-operated mechanism.

FIG. 21 shows a band diagram in the "PGM" state and the "ERS" state by operating the memory structure 20 based on the thyristor operation mechanism.

Please refer to FIG. 21, in the "PGM" operation, for example, by applying 0V to the first side pad CP and applying 3V to the second side pad BP, the above-mentioned positive feedback can be used to reduce or eliminate the electron energy barrier and the hole energy barrier, and the operation of hot carriers is not involved, Since the energy barrier has been eliminated, electrons and holes can move toward the middle of the channel body 220. In the "ERS" operation, in order to restore the electron energy barrier and the hole energy barrier, for example, 0V is applied to the first side pad CP, and 0V is applied to the second side pad BP, the voltages described in Table 2 is applied to the first gate 212 to the third gate 216, and the operation of hot carriers is not involved, either. Since the energy barrier has been established, electrons and holes cannot move to the channel body 220.

Figure 22:
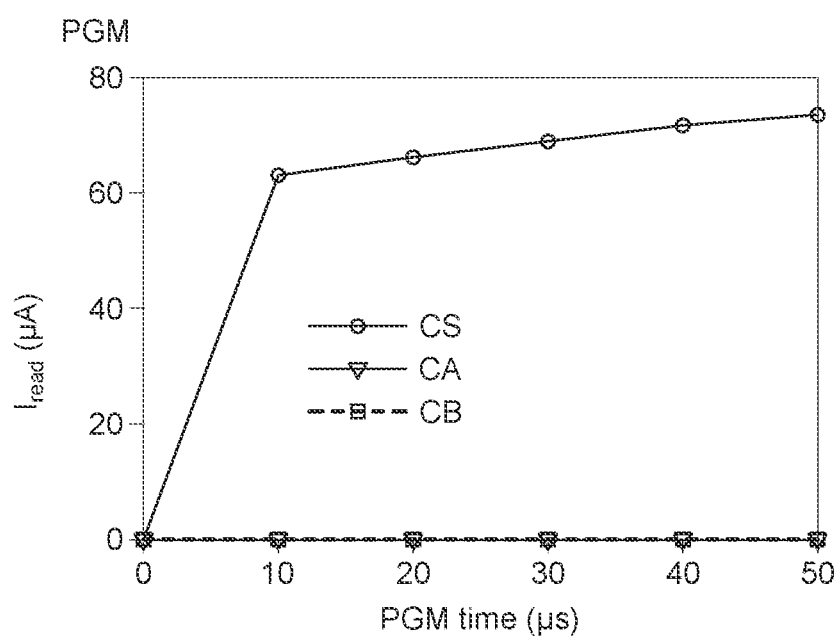
FIGS. 22 to 24 show experimental results for operating the memory structure based on the thyristor-operated mechanism.
Figure 23:
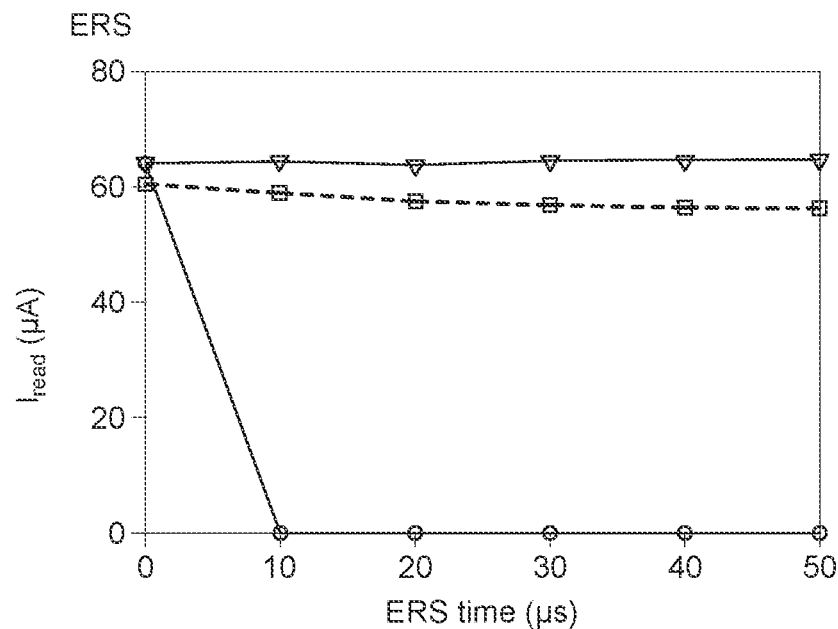
Figure 24:
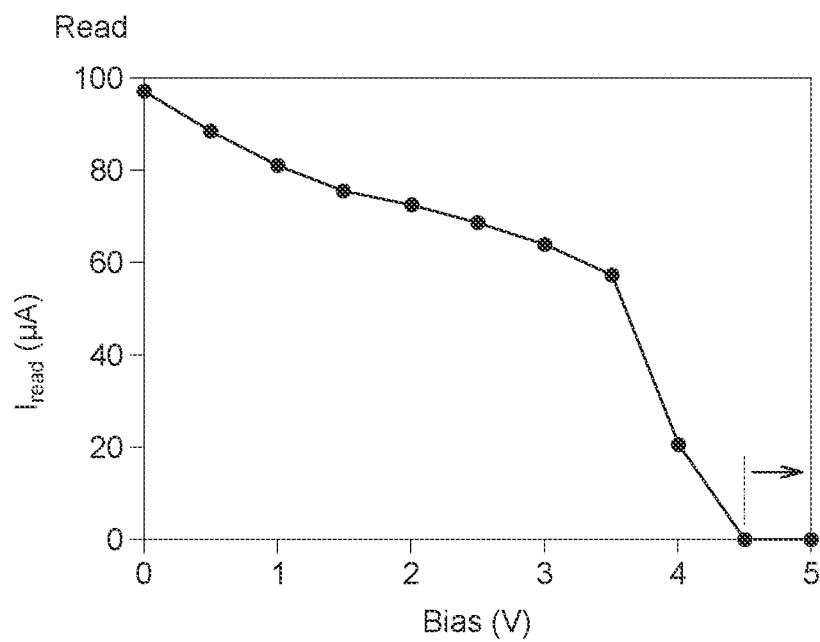

FIGS. 22 to 24 illustrate experimental results of operating the memory structure 20 based on the thyristor operating mechanism.

Please refer to FIG. 22, the X-axis represents the programming time (PGM time), in microseconds (µs); the Y-axis represents the read current ($I_{read}$), in microamperes (µA). During the "PGM" operation, the selected memory cell CS has a large current, and the unselected memory cells CA and CB are inhibited and have no current.

Please refer to FIG. 23, the X-axis represents the erasing time (ERS time), and the unit is microseconds (µs); the Y-axis represents the read current ($I_{read}$), and the unit is microamperes (µA). After the "ERS" operation, the selected memory cell CS has no current, and the unselected memory cells CA and CB maintain high current.

From the above results, it can be seen that whether it is "PGM" or "ERS", the memory cell CS can be selected reliably, and the memory cells CA and CB can be inhibited.

Referring to FIG. 24, the X-axis represents the bias voltage of the third gate structure 216, in volts (V); the Y-axis represents the read current ($I_{read}$) in the "PGM" state, in microamperes (µA). In "Read", −2V is applied to the first gate structure 212, 3V is applied to the second gate structure 214, and 2.5V is applied to the first bit line BL1. After the "Read" operation, since the selected memory cell CS and the unselected memory cell CB are connected to the same bit line (i.e., the first bit line BL1), in order to prevent the memory cell CB from also contributing current, the memory cell CB must be turned off, otherwise leakage current will be generated and a sneak path will be formed. Therefore, a sufficiently high bias voltage (for example, greater than 4.5V, as indicated by the arrow, such as 5V) must be applied to the unselected third gate structure 216 (for example, the fourth island structure 2161), so as to avoid the formation of the sneak path, and correctly read the selected memory cell CS.

According to an embodiment of the present invention, the first gate structure and the third gate structure of the memory structure both have three island structures, and the memory structure of the present invention is operated by the operating mechanism of the thyristor. It can be found that the memory structure of the present invention has high scalability and fast operation speed, and various electrical characteristics are better than that of the current DRAM in the industry.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory structure, comprising:
   a substrate having an upper surface;
   a first gate structure, a second gate structure and a third gate structure disposed on the substrate, separated from each other along a first direction and extending along a second direction and a third direction, respectively; and
   a plurality of channel bodies separated from each other and passing through the first gate structure, the second gate structure and the third gate structure along the first direction,
   wherein the first direction, the second direction and the third direction are intersected with each other, the upper surface is parallel to the first direction and the second direction, and a normal direction of the upper surface is parallel to the third direction;
   wherein the second gate structure is disposed between the first gate structure and the third gate structure, the first gate structure comprises a first island structure, a second island structure and a third island structure, the third gate structure comprises a fourth island structure, a fifth island structure and a sixth island structure, the first island structure, the second island structure and the third island structure respectively extend along the third direction and are separated from each other along the second direction; the fourth island structure, the fifth island structure and the sixth island structure respectively extend along the third direction and are separated from each other along the second direction, wherein a height of the first island structure, the second island structure or the third island structure in the third direction is equal to a height of the second gate structure in the third direction, and a width of the first island structure, the second island structure or the third island structure in the second direction is smaller than a width of the second gate structure in the second direction.

2. The memory structure according to claim 1, further comprising:
   a plurality of dielectric films disposed between the first gate structure and the channel bodies, between the second gate structure and the channel bodies, and between the third gate structure and the channel bodies; and
   a first side plug electrically connected to the substrate and the channel bodies.

3. The memory structure according to claim 2, wherein each of the channel bodies has a first end and a second end, the first end is adjacent to the first gate structure, the second end is adjacent to the third gate structure, and the second end is opposite to the first end.

4. The memory structure according to claim 3, further comprising:
   a plurality of first side pads stacked along the third direction and separated from each other along the third direction, wherein each of the first side pads is connected to the first end of a corresponding one of the channel bodies; and
   a plurality of second side pads stacked along the third direction and separated from each other along the third direction, wherein each of the second side pads is connected to the second end of a corresponding one of the channel bodies.

5. The memory structure according to claim 4, further comprising a plurality of second side plugs, wherein the second side plugs are separated from each other along the second direction, and extend along the third direction to electrically contact a plurality of landing regions on the second side pads, respectively.

6. The memory structure according to claim 5, wherein heights of the second side plugs in the third direction increase along the second direction, and the landing regions form a stepped structure.

7. The memory structure according to claim 5, wherein the second side plugs are respectively connected to a bit line.

8. The memory structure according to claim 4, wherein the first side plug is in electrical contact with the first side pads.

9. The memory structure according to claim 4, wherein the first side pads have a first conductivity type, and the second side pads have a second conductivity type.

10. The memory structure according to claim 1, wherein a material of the channel bodies comprises monocrystalline silicon.

11. The memory structure according to claim 1, wherein a height of the fourth island structure, the fifth island structure or the sixth island structure in the third direction is equal to a height of the second gate structure in the third direction, and a width of the fourth island structure, the fifth island structure or the sixth island structure in the second direction is smaller than a width of the second gate structure in the second direction.

12. The memory structure according to claim 11, wherein a width of the first island structure, the second island structure or the third island structure in the second direction is equal to a width of the fourth island structure, the fifth island structure or the sixth island structure in the second direction.

13. The memory structure according to claim 2, wherein a material of the dielectric films comprises a high dielectric constant material.

14. The memory structure according to claim 1, wherein the first gate structure, the second gate structure and the third gate structure serve as word lines.

15. The memory structure according to claim 1, wherein each of intersections of the first gate structure, the second gate structure and the third gate structure and the channel bodies forms a transistor.

16. The memory structure according to claim 15, wherein three transistors connected by a same channel body in the channel bodies together form a memory cell unit.

17. The memory structure according to claim 16, wherein a plurality of memory cell units at a same level are electrically connected to a same bit line.

18. The memory structure according to claim 1, wherein the first island structure, the second island structure and the third island structure are independently controlled.

19. The memory structure according to claim 1, wherein an operating mechanism of the memory structure is based on a thyristor.

* * * * *